April 22, 1958 E. LINDE, JR 2,831,316
ASSEMBLY APPARATUS WITH ALL LINK PART FEEDER
STATIONS FEEDING SAID PARTS PERPENDICULAR
TO THE ASSEMBLY SURFACE
Filed July 9, 1953 13 Sheets-Sheet 1

INVENTOR
EMIL LINDE JUN.
BY:

April 22, 1958 E. LINDE, JR 2,831,316
ASSEMBLY APPARATUS WITH ALL LINK PART FEEDER
STATIONS FEEDING SAID PARTS PERPENDICULAR
TO THE ASSEMBLY SURFACE
Filed July 9, 1953 13 Sheets-Sheet 2
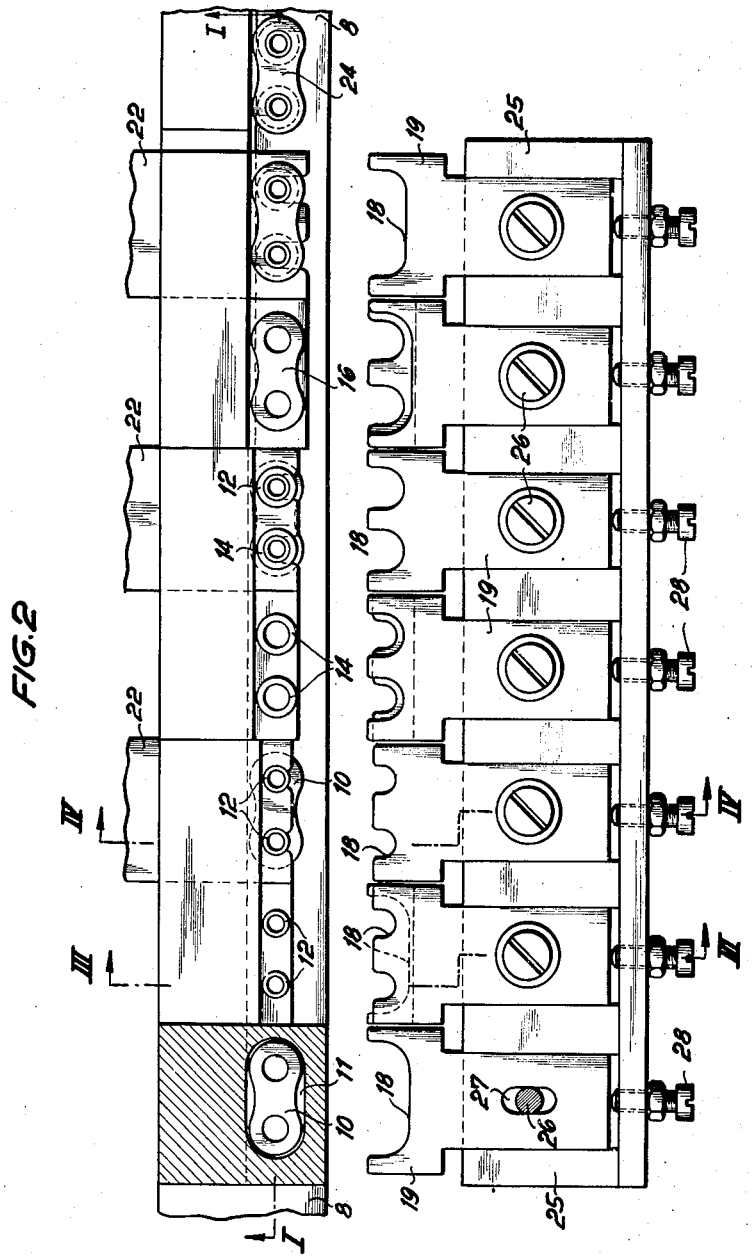
INVENTOR
EMIL LINDE JUN.
BY:

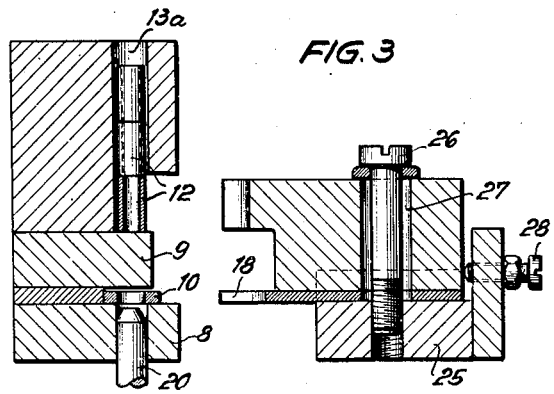
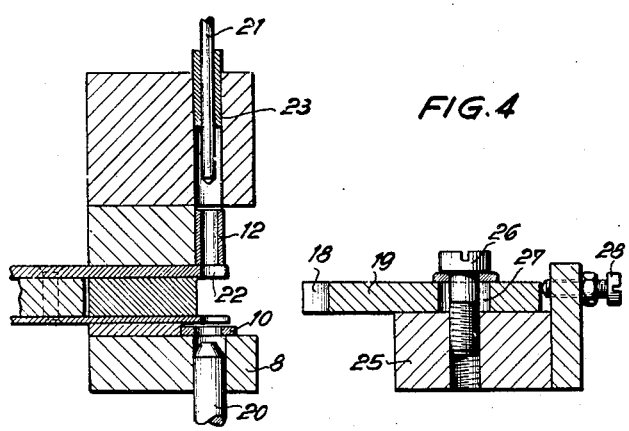

April 22, 1958
E. LINDE, JR
2,831,316
ASSEMBLY APPARATUS WITH ALL LINK PART FEEDER
STATIONS FEEDING SAID PARTS PERPENDICULAR
TO THE ASSEMBLY SURFACE
Filed July 9, 1953
13 Sheets-Sheet 4
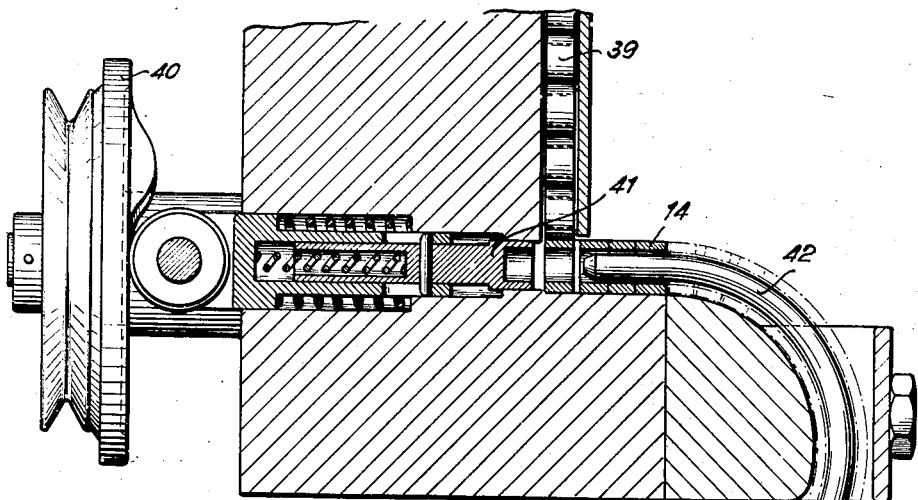
FIG. 7
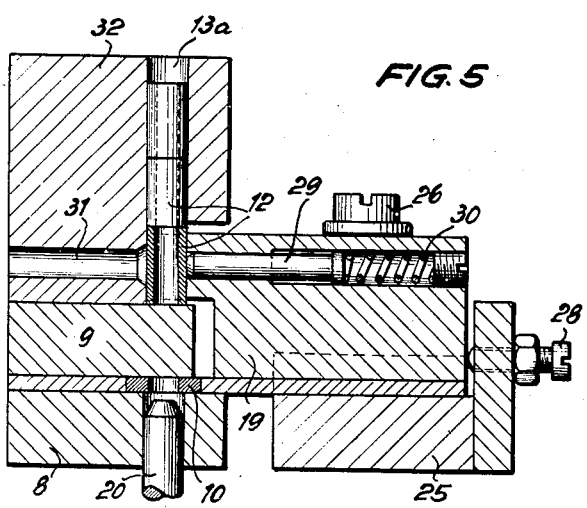
FIG. 5
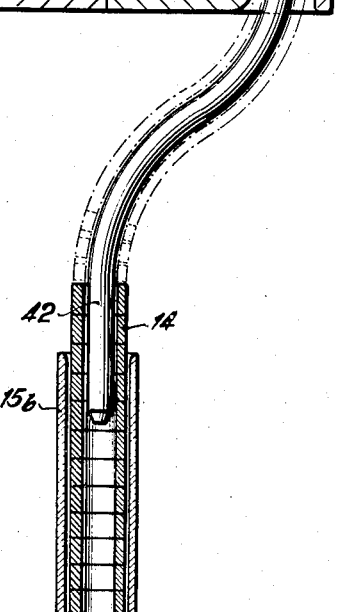
INVENTOR
EMIL LINDE JUN.
BY

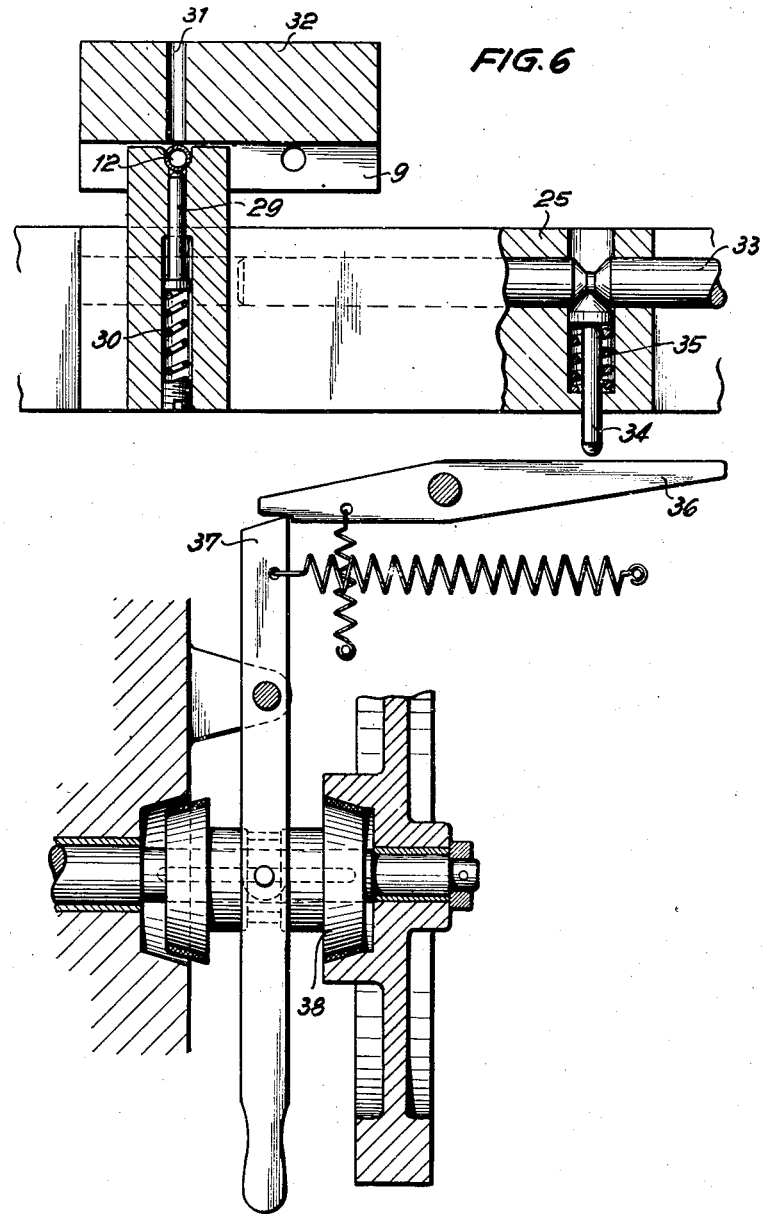

April 22, 1958 E. LINDE, JR 2,831,316
ASSEMBLY APPARATUS WITH ALL LINK PART FEEDER
STATIONS FEEDING SAID PARTS PERPENDICULAR
TO THE ASSEMBLY SURFACE
Filed July 9, 1953 13 Sheets-Sheet 6
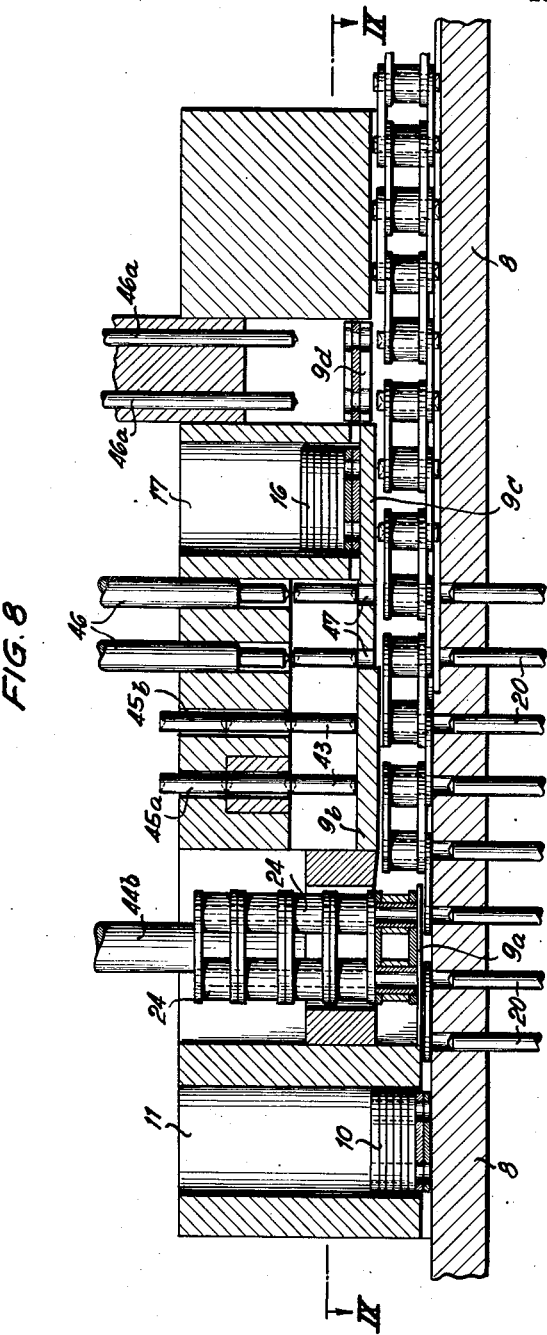
INVENTOR
EMIL LINDE JUN.

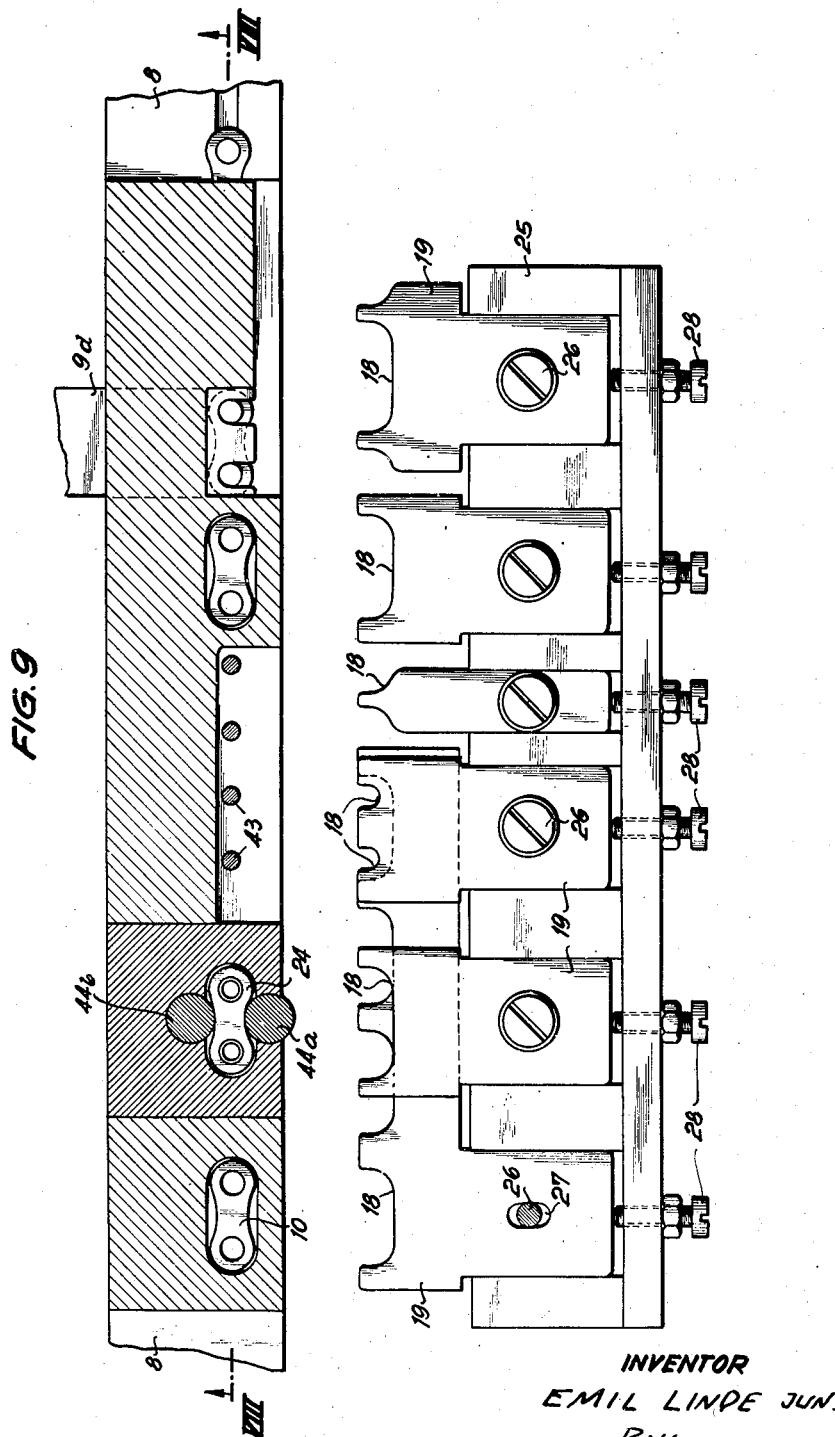

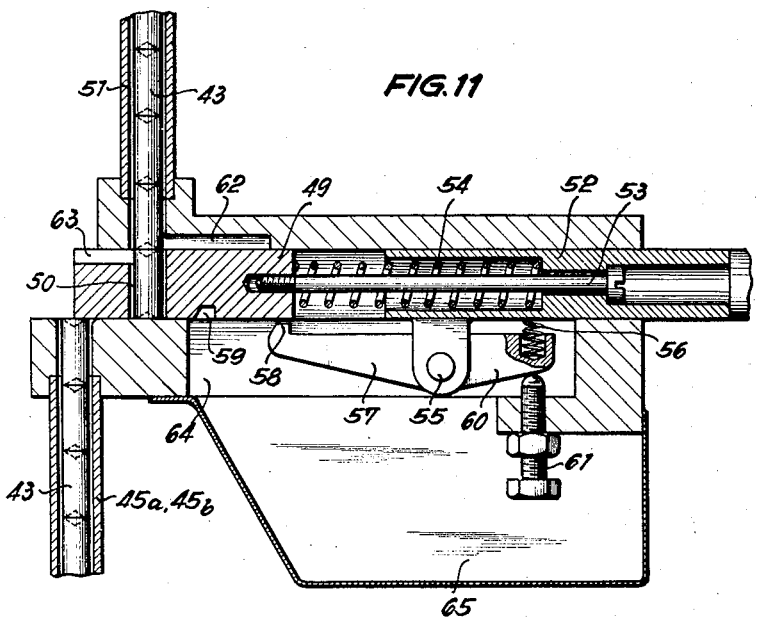
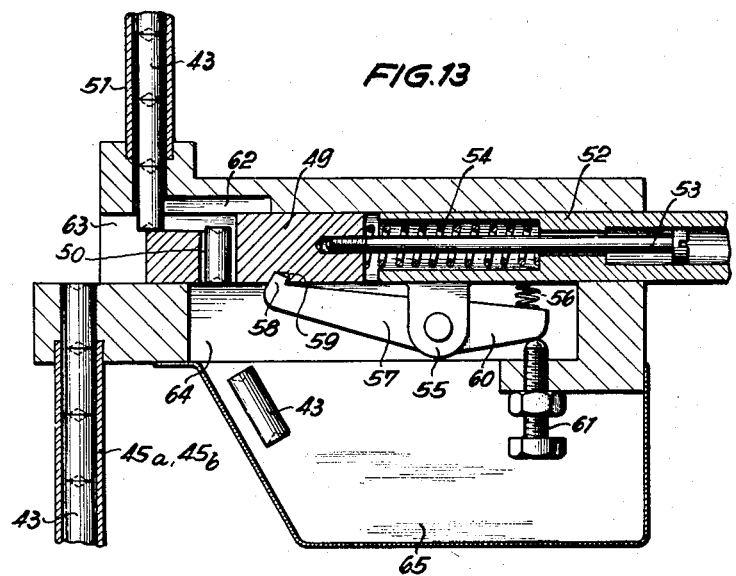

April 22, 1958  E. LINDE, JR  2,831,316
ASSEMBLY APPARATUS WITH ALL LINK PART FEEDER
STATIONS FEEDING SAID PARTS PERPENDICULAR
TO THE ASSEMBLY SURFACE
Filed July 9, 1953  13 Sheets-Sheet 10

INVENTOR
EMIL LINDE JUN.
BY:

April 22, 1958  E. LINDE, JR  2,831,316
ASSEMBLY APPARATUS WITH ALL LINK PART FEEDER
STATIONS FEEDING SAID PARTS PERPENDICULAR
TO THE ASSEMBLY SURFACE
Filed July 9, 1953  13 Sheets-Sheet 11

INVENTOR
EMIL LINDE JUN.

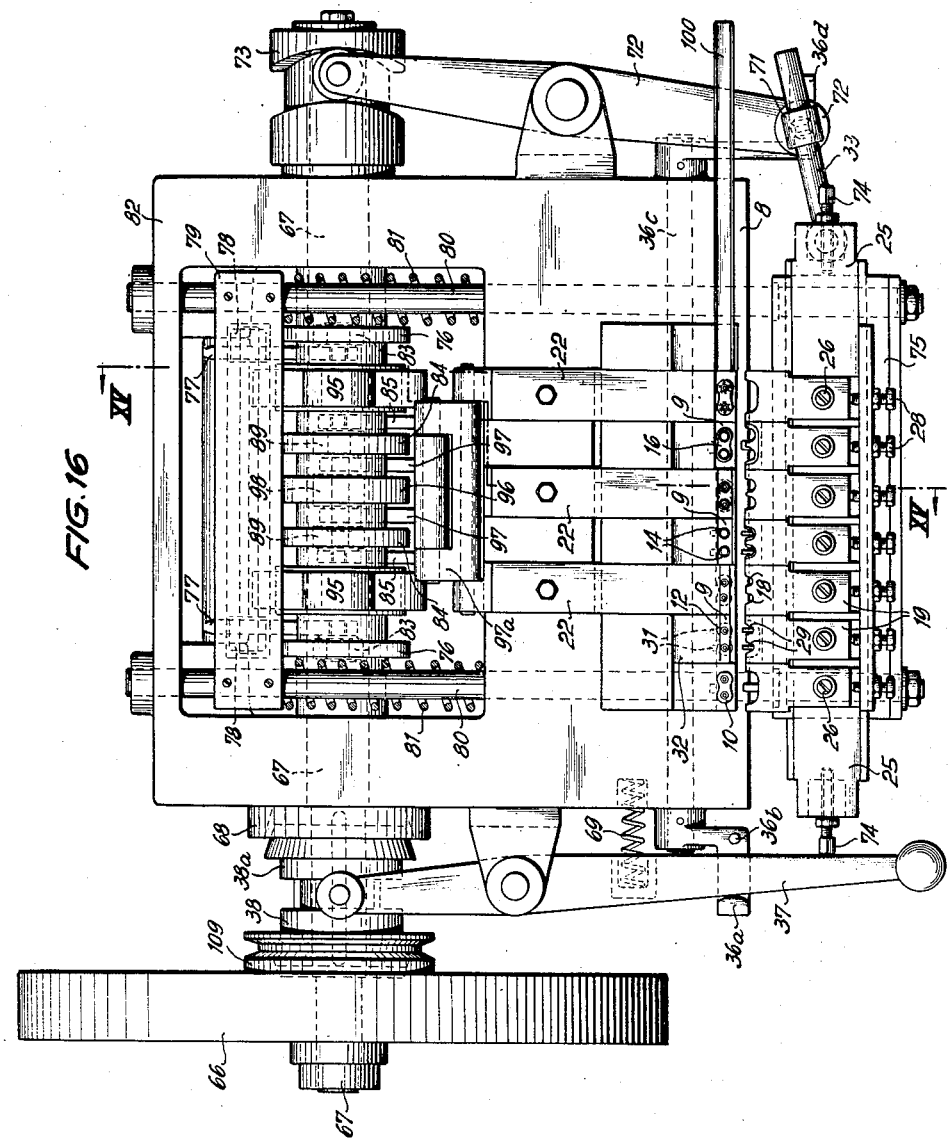

United States Patent Office 2,831,316
Patented Apr. 22, 1958

2,831,316

ASSEMBLY APPARATUS WITH ALL LINK PART FEEDER STATIONS FEEDING SAID PARTS PERPENDICULAR TO THE ASSEMBLY SURFACE

Emil Linde, Jr., Wuppertal-Barmen, Germany

Application July 9, 1953, Serial No. 367,007

Claims priority, application Germany July 11, 1952

8 Claims. (Cl. 59—7)

The present invention relates to an assembly apparatus and more particularly to an assembly apparatus which is adapted to assemble metallic parts into subassemblies and then to further assemble the subassemblies.

Known assembly apparatus of this type include several disadvantages flowing from the fact that the assembly process is fairly slow and of relatively low output and from the fact that the devices for lining up and assembling various parts are quite complicated and bulky and are not very reliable in operation. A good deal of time is lost with these known assembly apparatus because of the fact that the parts are improperly aligned with each other, which results in frequent shut downs and time consuming and expensive repairs.

One of the objects of the present invention is to overcome the above drawbacks by providing an assembly apparatus which guarantees that the parts to be assembled will be accurately and automatically located with respect to each other in proper position for assembly.

Another object of the present invention is to provide an assembly apparatus which operates efficiently at a relatively high speed so that the output of the apparatus is much higher than the output of comparable known apparatus.

A further object of the present invention is to provide an assembly apparatus which is capable of simultaneously moving assembled parts together with further parts to be assembled therewith to an assembly position.

An additional object of the present invention is to provide an assembly apparatus which is arranged in such a way that all of the parts to be assembled are simultaneously moved intermittently along a predetermined path where the parts are connected to each other.

Still another object of the present invention is to provide a means for automatically stopping the operation of the assembly apparatus when some of the parts to be assembled are lacking from the apparatus.

A still further object of the present invention is to provide an assembly apparatus with a means for efficiently delivering parts of various shapes to the apparatus in a fully automatic manner and in a predetermined position.

Yet another object of the present invention is to provide an assembly apparatus with a means for automatically rejecting parts which are of an improper size before these parts reach the assembly apparatus.

Also, the objects of the present invention include the provision of an assembly apparatus which is made up of relatively simple and ruggedly constructed parts which are very reliable in operation.

It is also an object of the present invention to provide an assembly apparatus particularly suited for the assembly of sprocket chain parts, although it is to be understood that the principles of the invention are applicable to the assembly of other devices.

With the above objects in view, the present invention mainly consists of an assembly apparatus which includes a support having a horizontal assembly surface on which parts are adapted to be assembled. A delivery platform is located on the support over the assembly surface in spaced relation thereto for receiving parts to be assembled with parts which are already located on the assembly surface, this delivery platform and assembly surface being located along an assembly path having a plurality of delivery and assembly positions alternating with each other, and the delivery platform being located at a plurality of delivery positions located after the first delivery position of the assembly path. A plurality of chutes are mounted on the support and extend upwardly from the assembly surface in a substantially vertical direction, at least one of these chutes having a bottom open end located directly over the assembly surface at the first delivery position and the other chutes having bottom open ends located respectively at delivery positions over the delivery platform so that parts to be assembled which are stacked in the chutes move by gravity in a substantially vertical direction downwardly along the chutes onto the assembly surface and delivery platform. A plurality of moving members are adapted to move the parts to be assembled from the delivery to the assembly positions, these moving members having free ends formed with cutouts to receive the parts to be assembled. A moving means is operatively connected to the moving members for cyclically moving the latter from a starting position first toward the assembly path in a direction substantially perpendicular thereto to the delivery positions, then along the assembly path to the assembly positions, then away from the assembly path in a direction substantially perpendicular thereto and finally back to the starting position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a fragmentary plan view taken along line II—II of Fig. 1 in the direction of the arrows;

Fig. 3 is a sectional view taken along line III—III of Figs. 1 and 2 in the direction of the arrows;

Fig. 4 is a sectional view taken along line IV—IV of Figs. 1 and 2 in the direction of the arrows;

Fig. 5 is a sectional view similar to Fig. 3 showing a different portion of the apparatus of Fig. 3 and illustrating the parts in a position different from that of Fig. 3;

Fig. 6 is a fragmentary, partly sectional, diagrammatic plan view of part of the apparatus of Fig. 5 shown in association with apparatus for automatically stopping the operation of the machine;

Fig. 7 is a fragmentary, partly sectional, elevational view of structure for supplying parts to be assembled to the assembly apparatus;

Fig. 8 is a view corresponding to Fig. 1 of a second stage of the assembly apparatus, Fig. 8 being taken along line VIII—VIII of Fig. 9 in the direction of the arrows;

Fig. 9 is a sectional plan view taken along line IX-IX of Fig. 8 in the direction of the arrows;

Fig. 11 is a fragmentary, sectional elevational view of another supply apparatus, the supply apparatus of Fig. 11 being capable of automatically rejecting parts which are of an improper size;

Figure 14:
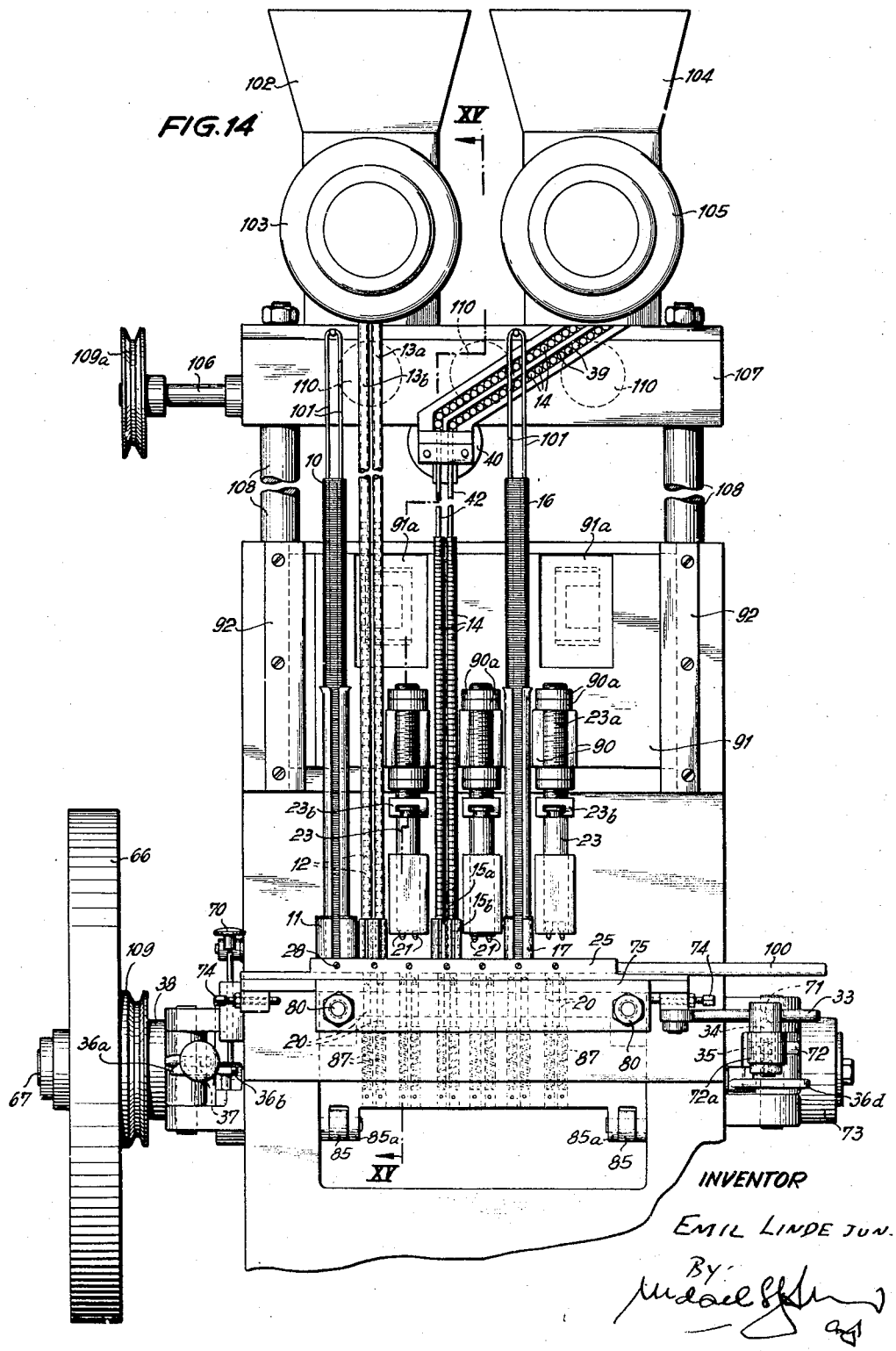
Figure 15:
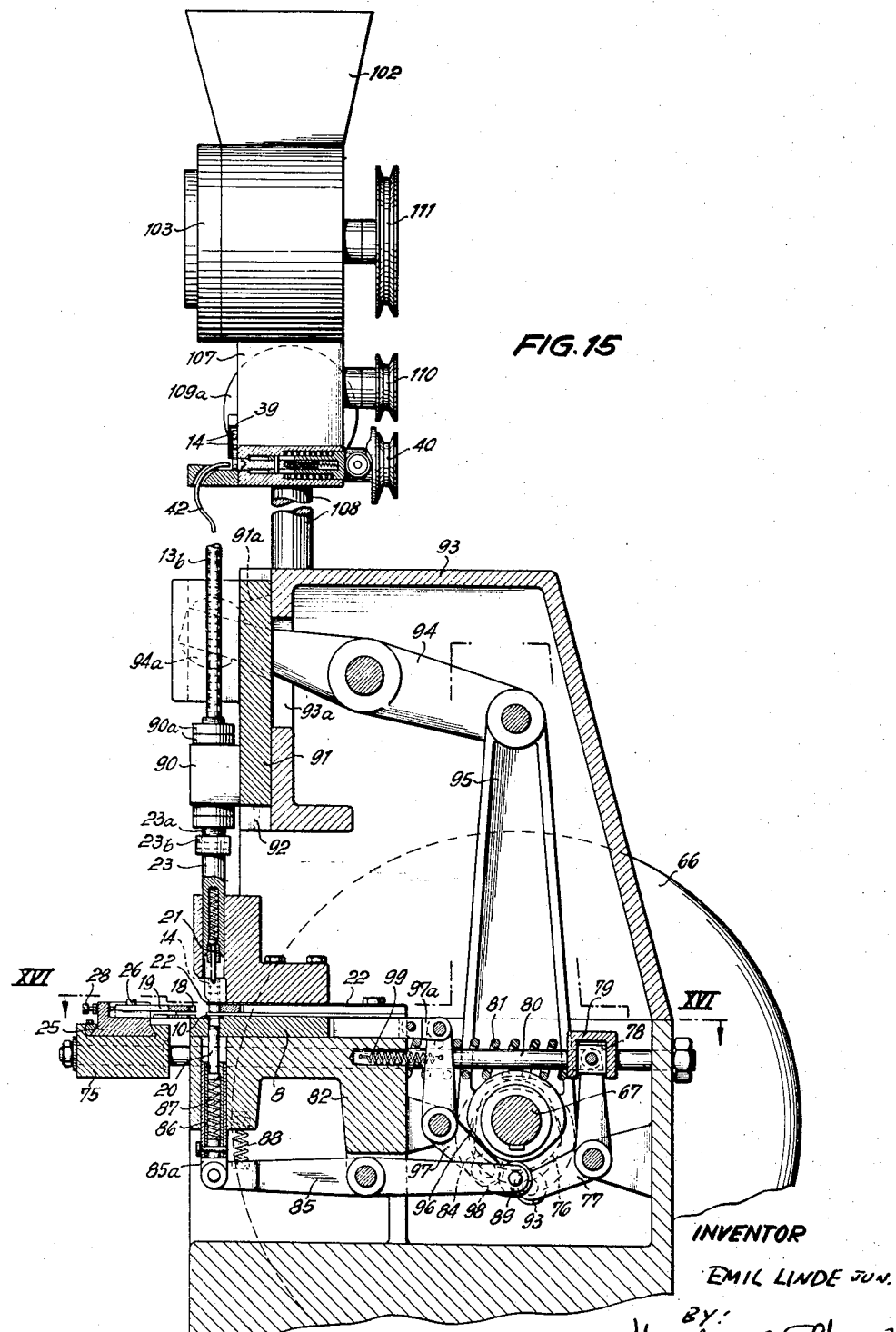

Fib. 12b is a fragmentary view of the apparatus of Fig. 11 showing how this apparatus handles parts which are too short;

Fig. 13 illustrates how the apparatus of Fig. 11 rejects parts which are of an improper size;

Fig. 14 is a fragmentary front elevational view of the entire machine for carrying out the first stage of the assembly shown in Figs. 1–5;

Fig. 15 is a fragmentary sectional view taken along line XV—XV of Figs. 14 and 16 in the direction of the arrows; and Fig. 16 is a sectional plan view taken along line XVI—XVI of Fig. 15 in the direction of the arrows.

The apparatus described below is particularly suited for the assembly of parts which form a sprocket chain, but it is to be understood that the general principles of the invention are applicable to many devices other than sprocket chains.

Figure 1:
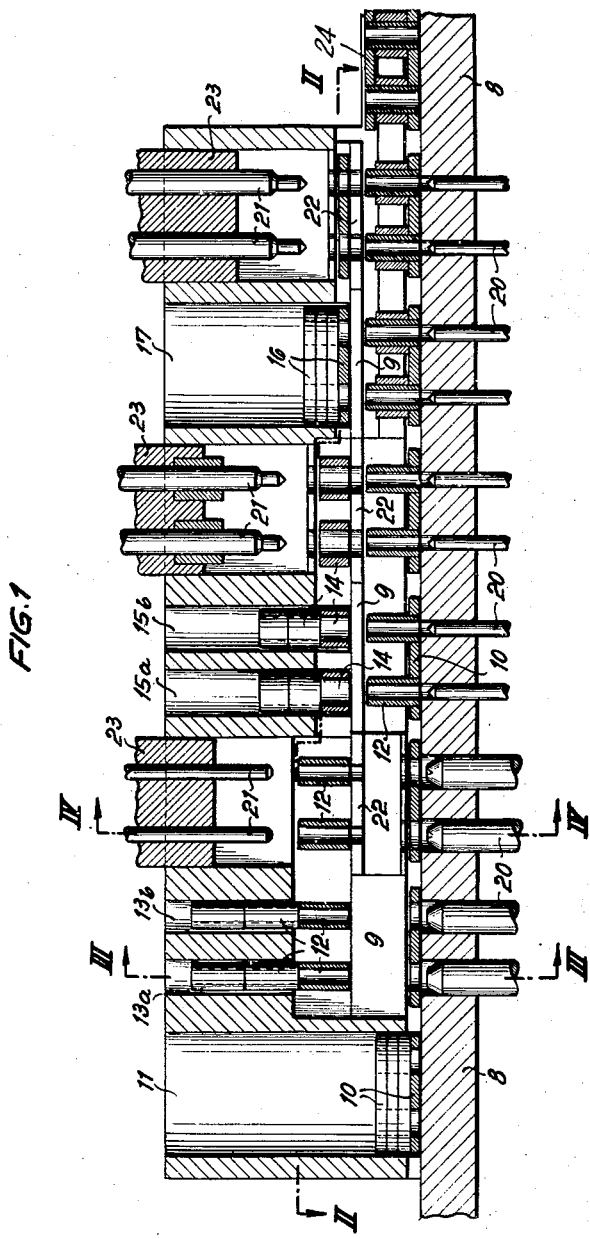
Fig. 1 is a fragmentary sectional elevational view of a part of the appartus of the invention along which several parts to be assembled are moved, Fig. 1 being taken along line I—I of Fig. 2 in the direction of the arrows.

Fig. 1 of the drawings shows a support 8 having a horizontal assembly surface forming the first assembly stage of the apparatus and along which parts of individual sprocket chain links are assembled, this first stage of the apparatus being shown in Figs. 1–5. The completed links are assembled in a second stage of the apparatus shown in Figs. 8 and 9 and described below. As may be seen from Figs. 1 and 3–5, a delivery platform 9 is located on the support 8 over the top assembly surface thereof and is parallel to and spaced therefrom. The assembly surface of support 8 and the platform 9 define as assembly path along which a plurality of delivery and assembly positions are arranged in alternating relationship, the several parts to be assembled being delivered to the several delivering positions and these parts being assembled at the several assembly positions.

The first delivery position of the assembly path is located directly on the assembly surface of the support 8 at the left end of the assembly path, as viewed in Figs. 1 and 2, from which it may be seen that a plurality of straps 10 for sprocket chain links are located one above another in a chute 11 which extends upwardly from the support 8 in a vertical direction and which has a bottom open end through which the straps may successively leave the chute 11 and move to the right to the first assembly position which is also located directly on the assembly surface of support 8.

The platform 9 extends over the remaining assembly and delivery positions located after the first delivery position. The second delivery position is located on the platform 9 next to the chute 11, and Figs. 1 and 2 illustrate how the tubular members 12 are arranged in a pair of vertically extending chutes 13a and 13b to fall by gravity onto the platform 9. Rollers 14, which in the final product are turnable on the tubular members 12, move downwardly along the chutes 15a and 15b to another delivery position located along platform 9, and the top straps 16 of the links, which are identical with the bottom straps 10, move downwardly along the chute 17 by gravity to the last delivery position on the platform 9.

As may be seen from Figs. 2–5, a plurality of moving members 19 are provided to move the parts to be assembled from the delivery to the assembly positions and to move the assembled parts from the assembly positions to the next delivery position, the moving members 19 being cyclically operated to move all of the parts simultaneously along the assembly path through one step during each cycle of movement of the moving members 19. These moving members 19 have front free ends formed with cutouts 18 which are shaped so as to mate with and properly engage the parts to be assembled which are located opposite the moving members 19.

When the moving members 19 are moving away from the assembly path back to their starting position, the parts located at the several assembly and delivery positions are fixed in position by centering pins 20 which are movable upwardly to engage the parts by an apparatus to be described below in connection with Figs. 14–16. The parts which are located on the delivery platform 9 are engaged by downwardly movable pins 21 which are associated with stamps 23 which move vertically to assemble the parts after retractable portions 22 of platform 9 are moved rearwardly so that the parts located on portions 22 may move downwardly onto the parts located thereabove on the assembly surface of platform 8. After return of parts 20–23 to their original position, the moving members 19 again move forwardly to again move all of the parts along the assembly path through one step, and at each of these movements a completed link 24 issues from the apparatus, as shown on the right end of Fig. 1 and 2.

As may be seen from Fig. 2, the leftmost moving member 19 is formed with a cutout 18 which moves forwardly beneath the chute 11 to engage the bottommost strap 10 and move the latter to the right to the second position shown in Fig. 1 where the member 10 is then located over the leftmost pair of centering pins 20 beneath the platform 9. Opposite this second position, a pair of moving members 19 at different elevations are provided, as is apparent from Figs. 2 and 3, the topmost of this pair of moving members being formed with cutouts 18 in which the pair of tubular members 12 at the bottom of chutes 13a and 13b are received, and the lower of the members 19 being substantially identical with the leftmost member 19 and engaging the strap 10 located at the second position so as to move the strap 10 together with the tubes 12 to the third position where these tubes 12 are located on the retractable portion 22 of platform 9, as is shown in Figs. 1, 2 and 4.

The strap 10 is centered at this third position by the second pair of pins 20 and the first pair of pins 21 move downwardly and extend into the pair of tubes 12 located on retractable portion 22. Then the latter is retracted and the stamp 23 moves downwardly together with the pins 21 to press the bottom ends to tubes 12 into the openings of strap 10. The third moving member 19, from the left as viewed in Fig. 2, is formed with a pair of cutouts 18 of the same shape as the cutouts 18 of the second member 19, but this third member 19 is located at a lower elevation, as is evident from Fig. 4, to engage the tubes 12 which have been connected to the strap 10 to move this assembly to the fourth position from the left shown in Figs. 1 and 2.

The rollers 14 are located on the platform 9 at this fourth position and a pair of moving members 19 are located over each other at this fourth position to simultaneously engage both the rollers 14 and the pair of tubes 12, assembled with strap 10 and located beneath platform 9, to move all of these parts to the fifth position of the assembly path where a second retractable portion 22 of platform 9 is located and where a pair of centering pins 20 as well as guiding pins 21 and a stamp 23 are located.

At this fifth position, the pins 21 move downwardly to engage the rollers 14, and then the second retractable portion 22 of platform 9 is withdrawn and the sleeves of stamp 23 located about pins 21 move downwardly along these pins and about the top ends of the tubes 12 to move the rollers 14 vertically onto the tubes 12. At this fifth position a moving member 19, having cutouts 18 of the same shape as the top moving member 19 at the fourth position but at a lower elevation than the same, moves forwardly to engage the assembled parts 10, 12 and 14 to move the latter to the sixth position located beneath that part of platform 9 on which the top straps 16 are located.

At this sixth position another pair of moving members 19 are provided to simultaneously engage both the strap 16 and the assembled parts 10, 12 and 14 to move the latter to the seventh position where a third retractable portion 22 of platform 9 is provided and where another pair of centering pins 21 and stamp 23 as well as a pair of centering pins 20 are located. This is the final assembly position where after retraction of the third retractable portion 22 of platform 9 the stamp 23 moves downwardly to push the strap 16 over the top ends of the tubes 12 so as to form a complete subassembly 24 which is moved along the assembly path to the end of the first stage of the apparatus by the seventh and last moving member 19 shown at the right end of Fig. 2.

Thus, it is evident that the above apparatus is arranged along an assembly path which includes at its left hand end, as viewed in Figs. 1 and 2, two delivery positions and then from left to right a first assembly position, a third delivery position, a second assembly position, a fourth delivery position, a third assembly position, and a fifth delivery position, the assembly positions after the first two delivery positions alternating with the remaining delivery positions. Also, it will be noted that the parts on the delivery platform 9 and the assembly surface of support 8 are moved simultaneously from the second, third, and fourth delivery positions to the succeeding assembly positions.

All of the moving members 19 are mounted on a carriage 25 and may be adjustably fixed thereon by loosening of screw members 26 which extend through elongated openings 27 in the moving members 19 and which are threadedly connected to the carriage 25, as is particularly evident from Figs. 3 and 4. Movement of members 19 with respect to carriage 25 for adjusting purposes may be brought about by the adjusting screws 28 provided with suitable lock nuts, and it is evident that each of the moving members 19 is independently adjustable so that great accuracy may be obtained.

Fig. 5 shows the structure of Fig. 3 at the instant when the carriage 25 has moved forwardly toward the assembly path to locate a moving member 19 in engagement with the tubes 12 at the second delivery position mentioned above, the bottom strap 10 also being engaged by a moving member 19 in this position. From the position of the parts shown in Fig. 5, the carriage 25 moves to the right, as viewed in Figs. 1 and 2, to move the tubes 12 and straps 10 to the first assembly position of the assembly path. As is evident from Fig. 5, the upper moving member 19 at this part of the apparatus is formed with an elongated bore in which a feeler member 29 is located, and the wall portion 32 formed with chute 13a is formed with an elongated bore 31 aligned with the feeler pin 29. A spring 30 is located in the upper moving member 19 of Fig. 5 and urges the feeler pin 29 forwardly out of this upper moving member 19 through the cutout 18 thereof, the spring 30 being of such a length that the pin 29 extends only partly of the bore of the moving member 19 of Fig. 5 when spring 30 is unstressed. A setscrew is provided to adjust the force of spring 30, as is evident from Fig. 5.

Fig. 5 shows how the presence of a tube 12 causes the feeler pin 29 to be moved into the top moving member 19 of Fig. 5 against the action of spring 30. However, when a tube 12 is lacking, as when the chute 13a becomes empty, the spring 29 will not be moved back against the action of spring 30 and will instead move into the bore 31 of rear wall 32 of the apparatus so that the carriage 25 will be prevented from moving to the right in the manner described above.

Fig. 6 shows how the apparatus is automatically stopped when the feeler pin 29 moves into opening 31. The carriage 25 includes a structure formed with a bore in which a pin 33 is slidably located and the moving means of the apparatus is connected to this pin 33 for moving the latter and the carriage 25 therewith. During normal operation, however, pin 33 cannot move with respect to carriage 25 because this pin 33 is formed with an annular cutout of tapering, conical cross section into which the conical free end of an actuating member 34 extends, as shown in Fig. 6, this member 34 also being mounted for movement on the structure of carriage 25 and having its conical end resiliently urged into the conical cutout of pin 33 by the spring 35. The other end of member 34 is located opposite a catch lever 36 which holds the lever 37 in the position, shown in Fig. 6, where the clutch member 38 is in engagement with a drive wheel for driving the apparatus, this lever 37 being held in this position by lever 36 against the action of a spring connected to lever 37 and urging the latter in a clockwise direction about its stationary pivotal mounting, as shown in Fig. 6.

When pin 29 becomes located in opening 31, the moving means which acts on pin 33 will then move the latter with respect to carriage 25 because this carriage cannot move, and the result is that the actuating member 34 is pushed out of the cutout of pin 33 against the action of spring 35 to engage the lever 36 and turn the latter in a clockwise direction, as viewed in Fig. 6, so as to release the lever 37 which then moves under the action of the spring connected thereto to shift the clutch 38 to the left, as viewed in Fig. 2 for disconnecting the apparatus from its drive and for simultaneously braking the movement of the apparatus since a conical brake shoe moves with clutch 38 and engages a stationary part of the apparatus when the clutch is disengaged, as is evident from Fig. 6.

Fig. 7 shows an apparatus for supplying the rollers 14 to the chutes 15a and 15b, only the chute 15a being shown in Fig. 7. It is to be understood, however, that an apparatus similar to that of Fig. 7 is provided to supply rollers 14 to the chute 15b. The rollers 14 move from the bottom end of a hopper, not shown in Fig. 7, into a chute 39 of rectangular cross section, and the rollers 14 have a length which is shorter than their diameter so that they can only become located in chute 39 in a position where the rollers have their axes extending transversely to the chute 39 so that the rollers 14 are located one above the other in the chute 39 with the outer peripheries of the rollers 14 in engagement with each other.

The bottom end of chute 39 is formed with a lateral opening at which the top horizontally extending end portion of a curved guide rod 42 terminates, this curved guide rod 42 extending freely through a curved opening in a support for the chute 39 and having a bottom substantially vertical free end portion, as shown in Fig. 7. The rollers 14 are located about the guide rod 42 and have their axes changed from a horizontal to a vertical position as the rollers 14 move downwardly along the guide rod 42 into the chute 15a whose top open end is located about the bottom end portion of rod 42. After a few rollers 14 are placed on the top end of rod 42, this rod is maintained in the position shown in Fig. 7 by the rollers 14 which move downwardly along the rod 42.

A plunger 41 is provided to move the rollers 14 from the bottom end of chute 39 onto the top end of guide rod 42, this plunger 41 being horizontally movable in the support for chute 39 and being resiliently urged away from a sleeve into which the plunger 41 extends, by a spring located in and fixed to this sleeve and the plunger 41. As is evident from Fig. 7, this sleeve is itself urged to the left, by a spring located about the sleeve, into engagement with a roller which is moved to the right by a cam portion at the periphery of a pulley 40 so that during each revolution of pulley 40 the plunger 41 moves to the right, as viewed in Fig. 7, to move a roller 14 onto the guide rod 42. Upon retraction of plunger 41 by leftward movement of the sleeve located about the same, as viewed in Fig. 7, the rollers 14 move downwardly in chute 39. The spring within this sleeve pulls the plunger 41 to the left upon movement of the sleeve to the left while at the same time being capable of being compressed to prevent jamming of the parts when rollers 14 are not moved out of chute 15a.

The second stage of the assembly operations takes place with the apparatus shown in Figs. 8 and 9 for connecting the several links 24 together to form a continuous sprocket chain. The apparatus of Figs. 8 and 9 operates according to the same principle as the apparatus of Figs. 1–5 and is constructed in the same way. The bottom straps 10 are guided along a second chute 11 onto the top assembly surface of a second tupport 8, shown in Fig. 8, and the completed subassemblies 24 are guided downwardly by rods 44a and 44b which extend into opposite lateral cutouts of straps 10 and 16, as shown in Fig. 9. These individual links 24 arrive at the platform 8 of the second stage next to the straps 10, and moving members 19 are provided on a second carriage 25 for moving the parts from the several delivery positions to the several assembly positions of the second assembly path shown in Figs. 8 and 9.

The individual links 24 are delivered onto a delivery platform 9a, and pivot pins 43, to turnably interconnect the several links 24, move downwardly along chutes 45a and 45b to the delivery platform 9b which is located over the assembly surface of support 8 in the same way that platforms 9 and 9a are located over this assembly surface. The platform 9b is provided, to the right of the delivery position of pivot pins 43, with a pair of openings 47 through which these pivot pins are adapted to move, the pivot pins 43 being pressed downwardly through the tubes 12 by the plungers 46. Additional straps 16 move downwardly along the chute 17 to the delivery platform 9c from which they are moved by one of the moving members 19 to the retractable platform portion 9d located beneath pins 46a which guide the straps 16 onto the top ends of pivot pins 43 after platform portion 9d is retracted. Centering pins 20 are provided in the same way as was described above in connection with Figs. 1–5.

The first moving member 19 shown at the left of Fig. 9 engages both the strap 10 located at the bottom of chute 11 as well as the straps 10 located beneath the platforms 9a and 9b to simultaneously move these straps 10 to the right, as viewed in Figs. 8 and 9, through one step of the assembly operations. The links 24 on the platform 9a are received in the cutout 18 of the second member 19 of Fig. 9 which is located over the first member 19, so that the links 24 are moved together with the bottom straps 10 to the third position shown in Fig. 8 beneath the left end of platform 9b. At this third position the pins 43 are engaged by the third member 19 shown in Fig. 9 to be moved to the right so as to be located over the openings 47 and the first member 19 is formed with additional cutouts 18 which engage the straps 10 to move the latter and the links 24 thereon to the right along with the pivot pins 43 which are pushed through the openings 47 by the plungers 46 so as to pass through the tubes 12 and a short distance beyond the openings of the outermost bottom straps 10.

It will be noted that the pairs of links are interconnected at this part of the assembly so that the fourth moving member 19 of Fig. 9 may be provided with only one tooth, formed by opposite cutouts 18, which moves between a pair of the thus-connected links for moving the latter to the next position beneath the platform portion 9c on which the top straps 16 are supported. Then the fifth moving member 19 of Fig. 9 engages the joined ends of a pair of links 24 beneath the platform 9c to move the links to the next position beneath the platform 9d, and it should be noted that a pair of identical moving members 19 are located one above the other at this position so that the top moving member 19 engages the bottom strap 16 in chute 17 to move the latter to the top of the retractable platform portion 9d. The guide pins 46a move downwardly into the openings of strap 16 and the platform portion 9d is retracted so that this strap 16 may move downwardly along guide pins 46a onto the top ends of the pivot pins 43 of a pair of adjacent links 24.

As may be seen from Fig. 9, the front end of retractable platform portion 9d is formed with cutouts through which the bottom ends of pins 46a may extend, so that the retractable platform portion 9d does not interfere with the movement of guide pins 46a. The last, righthandmost moving member 19 of Fig. 9 moves the completed assembly further along the assembly surface of support 8, and Figs. 8 and 9 clearly show an elongated groove formed in this support surface and into which the bottom ends of the pivot pins 43 extend upon being pressed by the plungers 46 through the tubes 12 and the bottom strap 10.

Thus, the apparatus is capable of providing a continuous sprocket chain which may be subdivided into separate endless chains later on. However, any suitable means may provide separate sprocket chain lengths of a predetermined size which may be formed into endless chains in a known way. For example the flow of pivot pins 43 may be interrupted after a predetermined number of cycles of movement of the members 19 so as to provide separate chain lengths. The upsetting of the outer ends of pivot pins 43 which extend beyond the outer straps 10 and 16 of the sprocket chain is carried out in a known way on the completed endless chain.

Figure 10A:
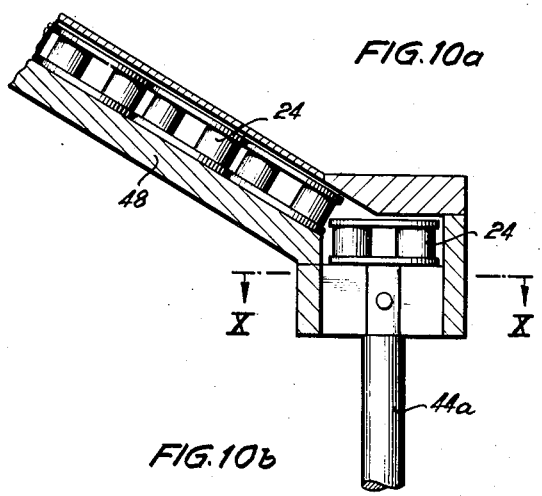
Fig. 10a is a fragmentary, partly sectional, elevational view of apparatus for supplying parts to be assembled to the second stage of the machine shown in Figs. 8 and 9.
Figure 10B:
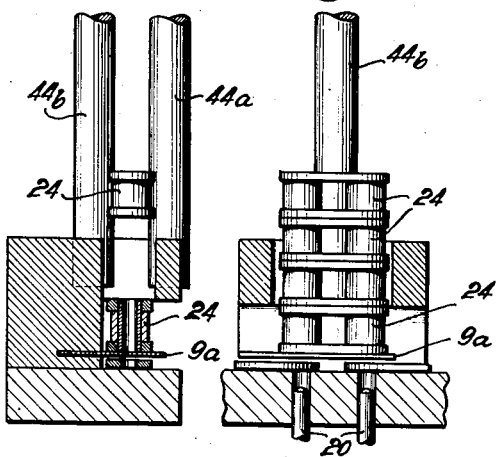
Fig. 10b is a fragmentary, partly sectional, elevational view of the lower part of Fig. 10a as seen from the left side thereof.
Figure 10C:
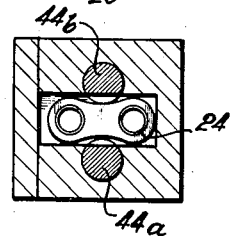
Fig. 10c is a sectional plan view taken along the line X—X of Fig 10a in the direction of the arrows.

Figs. 10a, 10b, and 10c show apparatus for supplying individual links 24, assembled by the first stage of the apparatus shown in Figs. 1–5, to the second stage of the apparatus shown in Figs. 8 and 9. The links 24 move from a hopper, not shown in Figs. 10a–10c and provided with a suitable agitator, along the inclined chute 48 which is of such a cross section that the links 24 are compelled to move along this chute in end to end relation as shown in Fig. 10a. The chute 48 is provided with a bottom opening to which the top ends of the parallel rods 44a and 44b are connected, these rods being spaced from each other at a distance slightly greater than the intermediate constricted portion of the straps 10 and 16 of the links 24 so that the rods 44a and 44b extend into this constricted portion of links which takes the form of opposite lateral cutouts in the intermediate side edge portions of the straps, this relationship being most clearly shown in Fig. 10c. As is evident from Fig. 10b, the bottom ends of the rods 44a and 44b are fixed to the support of the apparatus over the platform 9a so that the links 24 are guided downwardly by gravity between the rods 44a and 44b to be delivered to the platform 9a.

Figs. 11–13 show an apparatus for supplying the pivot pins 43 to the chutes 45a and 45b, the apparatus of Figs. 11–13 being capable of automatically rejecting pivot pins which are shorter or longer than a predetermined length. This supply apparatus takes the form of a rigid support formed with a cutout 62 having a bottom surface along which the moving member 49 slidably reciprocates. The cutout 62 has a front open end 63 which is of a reduced height. The support formed with cutout 62 is also formed with a top opening communicating with this cutout and with the chute 51 along which the pivot pins 43 move by gravity through this top opening into the cutout 62. Also, the support formed with cutout 62 is formed with a bottom opening communicating with the chute 45a and being spaced forwardly from the top opening, as shown in Fig. 11. The moving member 49 is formed with an opening 50 which, in the position of the parts shown in Fig. 11, is aligned with the top opening which communicates with chute 51, and the moving member 49 is movable forwardly to have its opening 50 aligned with the bottom opening which communicates with chute 45a so that a pivot pin 43 located in opening 50 will fall into chute 45a.

It is to be understood that actually a pair of chutes 51 are provided to deliver pivot pins 43 to a pair of openings 50 which are aligned with the chutes 45a and 45b, respectively, to deliver pivot pins 43 thereto. It should also be noted that the cutout 62 is provided to the rear of its top opening with a top surface which is located at a higher elevation than the top surface of the front end 63 of opening 62, and also the moving member 49 is provided to the rear of its opening 50 with a top surface portion located at a higher elevation than the top surface portion of member 49 extending forwardly from opening 50.

An elongated hollow member 52 is adapted to be reciprocated in any known way for reciprocating the moving member 49, and this hollow member 52 is formed with a bore through which a bolt 53, threadedly connected to member 49, freely extends so that the reciprocating member 52 is freely movable with respect to bolt 53. A coil spring 54 extends about bolt 53 and abuts at one end against member 49 and at its opposite end against the bored portion of member 52 through which bolt 53 extends. The head of bolt 53 engages the opposite end face of this bored portion of member 52 so that the spring 54 urges members 49 and 52 away from each other to the position shown in Fig. 11. During normal operation of the apparatus, the reciprocating member 52 operates on member 49 through the spring 54 so that the parts 49 and 52 are in the relative positions shown in Fig. 11 during normal operation.

A pair of ears 55 extend downwardly from member 52 into an elongated cutout 64 formed in the support, and these ears 55 carry a pivot pin extending through an intermediate portion of catch lever 57 to pivotally mount the latter. A spring 56 engages the lever 57 and member 52 to urge lever 57 in a clockwise direction, as viewed in Fig. 11, and the lever 57 is formed with a catch end 58 resting against the underside of member 49 to limit movement of lever 57 under the influence of spring 56. The bottom surface of member 49 is formed with a recess 59 adapted to receive catch end 58 of lever 57, as will be described below, and the lever 57 is provided with a bottom inclined surface 60 adapted to engage the top end of an adjustable screw 61 for relasing the catch lever 57.

Figure 12A:
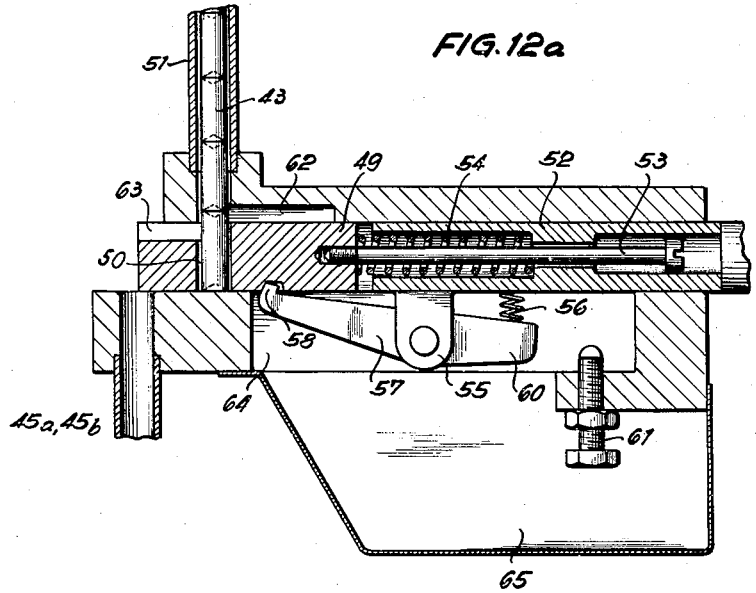
Fig. 12a is a view of the apparatus of Fig. 11 showing how the apparatus handles parts which are too long.
Figure 12B:
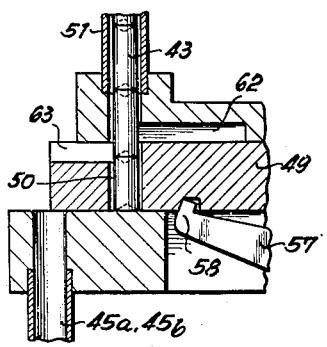

When the pivot pins 43 are of a predetermined length corresponding to the height of front end 63 of opening 62, the apparatus of Fig. 11 operates in its normal manner to successively deliver pins 43 to the chutes 45a and 45b during reciprocation of the member 49 in the manner described above. Fig. 12a illustrates the operation when a pivot pin 43 longer than the proper length becomes located in opening 50 of member 49. As is evident from Fig. 12a, this longer pivot pin cannot pass into the opening 63 and therefore prevents forward movement of member 49 so that the member 52 moves forwardly to compress spring 54 and the lever 57 also moves forwardly so that catch end 58 thereof becomes located in recess 59. Also, when a pivot pin 43 shorter than the predetermined length becomes located in opening 50 the member 49 will be prevented from moving forwardly, as shown in Fig. 12b, because in this event the pin above the shorter pin extends partly into the opening 50 to block forward movement of member 49, and thus in this case also the spring 54 becomes compressed and catch end 58 of lever 57 becomes located in recess 59.

Thus, when a pin 43 shorter or longer than the predetermined length thereof becomes located in opening 50, member 49 is connected to member 52 by the catch member 57 and moves rearwardly with member 52 to the position shown in Fig. 13 where the opening 50 communicates with opening 64 so that pins which are of an improper size fall downwardly through the cutout 64, a removable pan 65 being provided to catch the pins 43 which are automatically rejected by the apparatus of Fig. 11. Continued movement of members 49 and 52 rearwardly from the position shown in Fig. 13 causes inclined surface 60 of lever 57 to engage the top end of screw 61 to turn the lever 57 against the action of spring 56 so as to move catch end 58 out of recess 59 to release member 49 to the influence of spring 54. Thus, the member 49 will automatically move forwardly back to the position shown in Fig. 11 to receive the next pin 43.

Figs. 14–16 show an entire assembly of an apparatus for operating the first stage assembly structure shown in Figs. 1–5, and it is to be understood that a similar apparatus is provided for the second stage structure of Figs. 8 and 9. The apparatus of Figs. 14–16 includes a flywheel 66 which turns loosely on the drive shaft 67 and which is driven through a belt drive. The cone clutch member 38 is keyed to drive shaft 67 for movement therealong and rotation therewith and is movable into a conical recess of the driven flywheel 66 for transmitting the drive from the flywheel 66 to the shaft 67. In the disengaged position of clutch 38, the conical brake portion 38a thereof enters into a hollow conical recess of fixed member 68 to brake the rotation of drive shaft 67. The pivotally mounted lever 37 which actuates the clutch is urged by spring 69 into the position where the clutch is disengaged (see also Fig. 6), and therefore the spring 69 urges the apparatus to its rest position.

Lever 36b is provided with a pawl 36a, having a top inclined surface (Fig. 14) for engaging lever 37 to hold the latter against the action of spring 69 in the position of Fig. 16 where the clutch 38 is engaged. The lever 36b is urged upwardly and held in the upper position shown in Figs. 14 and 16 by a spring (not shown). The lever 36b is fixed to a shaft 36c which extends through the apparatus to the opposite side thereof, and a lever 36d is fixed to the end of shaft 36c opposite from lever 36b. Both levers 36b and 36d form the double arm lever 36 illustrated schematically in Fig. 6. A vertically movable rod 70 having a handle at its top end, as shown in Fig. 14, has its lower end located next to lever 36b so that rod 70 may be depressed to turn lever 36b downwardly to stop the operation of the apparatus, or the actuating member 34, shown in Fig. 14 and described above in connection with Fig. 6, is movable downwardly to turn lever 36d downwardly so as to also turn lever 36b downwardly for stopping the operation of the apparatus in this way also. In either event, the downward movement of lever 36b moves the pawl 36a downwardly to release lever 37 to the influence of spring 69.

The automatic operation of member 34 when the carriage 25 is prevented from moving was described above in connection with the structure schematically shown in Fig. 6, and the structure of Fig. 14 operates according to the same principle although the details are somewhat different. The pin 33 through which the carriage 25 is reciprocated is not mounted in the carriage 25 as shown in Fig. 6, but is instead located in a bore of mounting structure 71 which is turnable in the eye 72a located at an end of the lever 72, as shown in Figs. 14 and 16, and this pin 33 is pivotally connected at its left end, as viewed in Figs. 14 and 16, to the carriage 25.

The two-armed lever 72 is pivotally supported at an intermediate portion, as is shown at the right-hand side of Fig. 16, and the end of lever 72 opposite from eye 72a carries a roller extending into a cam groove of cam 73 fixed to drive shaft 67 so that during rotation of the drive shaft the lever 72 is turned to pull and push pin 33 so as to reciprocate carriage 25 to the right and left, as viewed in Fig. 16, respectively.

The pin 33 extends slidably through member 71 and is provided with an annular cutout of conical cross section into which the conical top end of member 34 extends under the force of spring 35, in the same way as was described above in connection with Fig. 6. In this way the pin 33 is held immovable with respect to member 71 so that movement is transmitted through pin 33 from lever 72 to carriage 25. When the carriage 25 is prevented from moving, as by the pin 29 in the manner described above, the member 71 is moved by lever 72 with respect to pin 33 so as to move pin 34 out of the cutout of pin 33 against the action of spring 35, and in this way the pin 34 is moved downwardly to engage lever 36d to turn both this lever and lever 36b downwardly so as to release lever 37 to the action of spring 69 to automatically cut off the drive from flywheel 66 to shaft 67 and in this way stop the operation of the apparatus.

For the sake of safety, limiting screws 74 are provided at the opposite end of carriage 25 and are adjusted to allow carriage 25 to move through a stroke corresponding to the stroke provided by cam 73. When this stroke is exceeded, one of the screws 74 engages an end of the guide 75, on which carriage 25 is slidable, to prevent movement of carriage 25 and thereby cause relative movement of structures 33 and 71 to also automatically stop the apparatus in this event.

The carriage 25 is moved toward the parts to be assembled before movement of carriage 25 to the right, as viewed in Fig. 16, to advance the parts to be assembled along the assembly path, in the manner described above, and the carriage 25 is then moved away from the parts to be assembled. This movement of carriage 25 toward and away from the parts to be assembled is brought about by moving the guide 75 and the carriage 25 therewith toward and away from the parts to be assembled. The guide 75 is moved through the medium of a pair of cams 76 fixed to the drive shaft 67 for rotation therewith and engaging rollers on a pair of bell cranks 77 turnably mounted on the apparatus, as shown in Fig. 15. The bell cranks 77 are pivotally connected at their top ends to blocks 78 which are slidable in the substantially U-shaped channel member 79 which extends across the apparatus and which is connected to the rods 80 slidably mounted on the apparatus for forward and rearward movement and connected to the guide 75. Springs 81 are respectively located about rods 80 and engage the frame of the apparatus and the channel member 79 for urging the guide 75 toward the parts to be assembled and for urging the bell cranks 77 in a clockwise direction, as viewed in Fig. 15, so as to maintain the rollers at the bottom ends of bell cranks 77 in engagement with cams 76. The cams 76 and 73 are so shaped and arranged that during one revolution of drive shaft 67 the carriage 25 is moved from the starting position shown in Figs. 2 and 16 first toward the parts to be assembled so that moving members 19 engage the latter, then to the right, as viewed in Figs. 2 and 16 to move the parts to be assembled through one step along the assembly path, then away from the parts to be assembled, and finally to the left back to the starting position.

When the stroke of members 19 along the assembly path has been completed, the centering pins 20, stamps 23, and guide pins 21 are actuated, and the apparatus for actuating the parts 20, 21 and 23 is also driven from the drive shaft 67. The centering pins 20 are actuated by a pair of double armed levers 85, shown in Fig. 15, which are provided at their right ends, as viewed in Fig. 15, with rollers which engage a pair of cams 84 fixed to the shaft 67 and positioned with respect to cams 76 so as to turn the levers 85 in a clockwise direction, as viewed in Fig. 15, after guide 75 has been moved away from the parts to be assembled by the cams 76 and levers 77. A member 85a extends across the apparatus and is pivotally connected to the front ends of levers 85, as shown in Fig. 15, this member 85a being formed with a plurality of bores in which sleeves 86 are located, these sleeves 86 being fixed to the member 85a and having coil springs 87 located therewith. The centering pins 20 respectively extend into the sleeves 86 and engage the top ends of springs 87. Thus, upon clockwise turning of levers 85 by cams 84, the springs 87 and centering pins 20 therewith are urged upwardly so that these centering pins 20 yieldably engage the parts to be assembled to properly locate the latter. Springs 88, shown in Fig. 15, engage the frame of the apparatus and the levers 85 to urge the latter in a counterclockwise direction, as viewed in Fig. 15, so as to maintain the rollers of levers 85 in engagement with cams 84.

The stamps 23, in which the guide pins 21 are located for yieldable sliding movement under the influence of springs located in bores of stamps 23 and fixed to pins 21 as well as stamps 23, are adjustable in elevation and connected to the bifurcated guides 90, respectively. The guides 90 are cast in one piece with carriage 91 which is guided for vertical movement by the vertically extending guide strips 92, as shown in Fig. 14. Carriage 91 is formed with a pair of openings 91a and the upper frame part 93 is formed with a pair of openings 93a respectively communicating with openings 91a.

A pair of levers 94 are turnably mounted on the apparatus and extend through each pair of communicating openings 91a and 93a. At their right-hand ends, as viewed in Fig. 15, the double-armed levers 94 are pivotally connected to connecting rods 95 respectively having bottom openings in which discs are respectively turnable, these discs being eccentrically connected to the drive shaft 67 so that connecting rods 95 are reciprocated to turn levers 94 during rotation of shaft 67. The left free end of levers 94, as viewed in Fig. 15, are respectively joined to balls forming with spherical recesses in carriage 91 ball and socket joints 94a to transmit vertical movement to the carriage 91 from levers 94, and the balls of the ball and socket joints are slidable on the levers 94 to compensate for the change in radial distance from the turning axis of levers 94 during vertical movement of carriage 91. The ball and socket joints 94a are omitted from Fig. 14 for the sake of clarity.

The pressure stamps 23 are each made up of a plurality of parts. The top parts 23a, which are provided with threads, may be removed forwardly out of the bifurcated guides 90 in which they are respectively located, when the nuts 90a, fixing the members 23a to the guides 90 are loosened. The bottom end portion 23b of each part 23a is formed with a T-groove into which the T-shaped head of the corresponding stamp 23 is slidable. When the threaded part 23a is removed, by moving it out of the guide 90 and from the T-shaped head of stamp 23, then this stamp 23 can be moved upwardly out of its guide and exchanged for another stamp. The nuts 90a in addition to fixing threaded parts 23a to the guide 90 also serve to adjust the elevation of the stamp 23. It is believed to be evident that as the levers 94 turn to move the plate 91 vertically along the guides 92, the stamps 23 will also be moved vertically and the guide pins 21, which are yieldably movable within the stamps 23, move together with these stamps.

Shortly after the parts to be assembled are engaged by the guide pins 21, the retractable portions 22 of the platform 9 must be moved to the rear, these retractable portions 22 being shown most clearly in Fig. 16. This movement of the retractable portions 22 is also derived from the drive shaft 67. A cam 96 is fixed on the drive shaft 67 to move the retractable platform portions 22 at the proper time, this cam 96 engaging a roller 98 located between and connected to a pair of bell cranks 97, as is evident from Figs. 15 and 16, which are pivotally mounted on the frame of the apparatus, as shown in Fig. 15. The top ends of the bell cranks 97 are pivotally connected to a link 97a which is in turn pivotally connected to the three retractable platform portions 22. A spring 99, shown in Fig. 15, is connected at one end to the frame of the machine and at its opposite end to the bell crank 97 to urge the latter in a counterclockwise direction, as viewed in Fig. 15, so as to maintain the roller 98 in engagement with the cam 96 which, during rotation of the drive shaft 67, controls the movement of platform portions 22 so that this movement is properly synchronized with the movement of the remaining parts of the apparatus.

The completed chain links leave the apparatus of Figs. 14-16 along the guide rail 100, and Fig. 14 shows the structure for supplying the several components of the individual links 24 to the apparatus. The straps 10 and 16 are placed, by hand, for example, on resilient hair-like wires 101 which are suspended at their top ends and extend freely down into the interior of chutes 11 and 17, as shown in Fig. 14, these wires 101 each having opposite parallel portions extending through the openings of the straps 10 or 16. The wires 101 may be easily exchanged, and the straps 10 simply move by gravity downwardly along the wire 101 into the chute 11 while the straps 16 move by gravity downwardly along the wire 101 into the chute 17.

The tubular members 12 are located in the hopper 102 which is agitated by a known agitating apparatus 103 so that the tubular members 12 move by gravity from the hopper 102 to the chutes 13a and 13b. The rollers 14 are similarly located in a hopper 104 agitated by the agitating device 105, and these rollers move downwardly along the chutes 39 to the apparatus, shown in Fig. 7 and illustrated in Fig. 15, from where the rollers 14 move along the curved guide rods 42 into the chutes 15a and 15b, in the manner described above in connection with Fig. 7.

The agitators 103 and 105 as well as the apparatus of Fig. 7 and the hoppers 102 and 104 are carried by a support 107 which is in turn carried by a pair of columns 108 of the machine frame. The drive for the apparatus carried by the support 107 is derived from the V-belt pulley portion 109 of the flywheel 66 which, through a suitable V-belt, drives the pulley 109a connected to the support 107 for driving the apparatus carried thereby. The flywheel 66 is itself rotated by any suitable belt drive extending, for example, about the periphery of the flywheel.

Pulley 109a is fixed to shaft 106 to rotate the latter, this shaft 106 extending through support 107 and driving pulleys 110 through a suitable gearing. The two outermost pulleys 110 of Fig. 14 drive pulleys 111 (Fig. 15) through suitable belts, and pulleys 111 respectively operate agitators 103 and 105. The intermediate pulley 110 of Fig. 14 is connected by a V-belt to pulley 40 to rotate the latter.

It will be understood that each of the elements described above, or two or more together, may also find a useful application in other types of assembly apparatus differing from the types described above.

While the invention has been illustrated and described as embodied in assembly apparatus for assembling sprocket chain parts and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Assembly apparatus comprising, in combination, a support having a stationary horizontal assembly surface on which parts are adapted to be assembled along a predetermined path; and guide means mounted on said support for guiding parts to be assembled downwardly onto said assembly surface in a substantially vertical direction, said guide means comprising a plurality of substantially vertical chutes having bottom open ends located adjacent to each other along said predetermined path over said assembly surface and in which the parts to be assembled are stacked so as to move downwardly in said chutes to said assembly surface by gravity and reach said assembly surface at spaced points of assembly along said predetermined path, whereby all of the parts move towards said path, only in a direction substantially normal to said assembly surface.

2. Assembly apparatus comprising, in combination, a support having a stationary horizontal assembly surface on which parts are adapted to be assembled along a predetermined path; a delivery platform located on said support over said assembly surface in spaced relation thereto for receiving parts to be assembled with parts which are already located on said assembly surface; and a plurality of chutes mounted on said support, at least one of said chutes having a bottom open end located directly over said assembly surface and the other chutes having bottom open ends located over said delivery platform, said bottom open ends of said chutes being located adjacent to each other along said predetermined path and all of the chutes of the apparatus extending upwardly from said assembly surface in a substantially vertical direction so that parts to be assembled which are stacked in said chutes move by gravity in a substantially vertical direction downwardly along said chutes onto said assembly surface and delivery platform and reach said assembly surface at spaced points of assembly along said predetermined path, whereby all of the parts move towards said path only in a direction substantially normal to said assembly surface.

3. Assembly apparatus comprising, in combination, a support having a stationary horizontal assembly surface on which parts are adapted to be assembled; a delivery platform located on said support over said assembly surface in spaced relation thereto for receiving parts to be assembled with parts which are already located on said assembly surface, said delivery platform and assembly surface being located along an elongated assembly path having a plurality of delivery and assembly positions alternating with each other and said delivery platform being located at a plurality of delivery positions located after the first delivery position of the assembly path; and a plurality of chutes mounted on said support, at least one of said chutes having a bottom open end located directly over said assembly surface at said first delivery position and the other chutes having bottom open ends located respectively at delivery positions over said delivery platform and all of the chutes of the apparatus extending upwardly from said assembly surface in a substantially vertical direction so that all parts to be assembled which are stacked in said chutes move by gravity in a substantially vertical direction downwardly along said chutes onto said assembly surface and delivery platform directly to said delivery and assembly positions located along said assembly path.

4. An assembly apparatus comprising, in combination, a support having a stationary horizontal assembly surface on which parts are adapted to be assembled; a delivery platform located on said support over said assembly surface in spaced relation thereto for receiving parts to be assembled with parts which are already located on said assembly surface, said delivery platform and assembly surface being located along an elongated assembly path having a plurality of delivery and assembly positions alternating with each other and said delivery platform being located at a plurality of delivery positions located after the first delivery position of the assembly path; a plurality of chutes mounted on said support, at least one of said chutes having a bottom open end located directly over said assembly surface at said first delivery position and the other chutes having bottom open ends located respectively at delivery positions over said delivery platform and all of the chutes of the apparatus extending upwardly from said assembly surface in a substantially vertical direction so that all parts to be assembled which are stacked in said chutes move by gravity in a substantially vertical direction downwardly along said chutes onto said assembly surface and delivery platform directly to said delivery and assembly positions located along said assembly path; a plurality of moving members adapted to move parts to be assembled from said delivery to said assembly positions, said moving members having free ends formed with cutouts to receive the parts to be assembled; and moving means operatively connected to said moving members for cyclically moving the latter from a starting position first toward said path in a direction substantially perpendicular thereto to said delivery positions, then along said path to said assembly positions, then away from said path in a direction substantially perpendicular thereto, and finally back to said starting position.

5. Assembly apparatus comprising, in combination, a support having a stationary horizontal assembly surface on which parts are adapted to be assembled; a delivery platform located on said support over said assembly surface in spaced relation thereto for receiving parts to be assembled with parts which are already located on said assembly surface, said delivery platform and assembly surface being located along an elongated assembly path having a plurality of delivery and assembly positions alternating with each other and said delivery platform being located at a plurality of delivery positions located after the first delivery position of the assembly path; a plurality of chutes mounted on said support, at least one of said chutes having a bottom open end located directly over said assembly surface at said first delivery position and the other chutes having bottom open ends located respectively at delivery positions over said delivery platform and all of the chutes of the apparatus extending upwardly from said assembly surface in a substantially vertical direction so that all parts to be assembled which are stacked in said chutes move by gravity in a substantially vertical direction downwardly along said chutes onto said assembly surface and delivery platform directly to said delivery and assembly positions located along said assembly path; a plurality of moving members adapted to move parts to be assembled from said delivery to said assembly positions, said moving members having free ends formed with cutouts to receive the parts to be assembled; and moving means operatively connected to said moving members for cyclically moving the latter from a starting position first toward said path in a direction substantially perpendicular thereto to said delivery positions, then along said path to said assembly positions, then away from said path in a direction substantially perpendicular thereto, and finally back to said starting position, some of said moving members being arranged in pairs located at different elevations directly over each other for simultaneously engaging parts on said delivery platform and already assembled parts on said assembly surface beneath said delivery platform so that already assembled parts will be moved simultaneously with further parts to be assembled to said assembly positions.

6. Assembly apparatus as defined in claim 5, said delivery platform having retractable portions which are movable away from said path and located on the opposite side thereof from said moving members respectively at assembly positions of said path, and combination positioning and assembly means located over said retractable parts of said delivery platform and having positioning and assembly members movable downwardly toward said assembly surface for respectively engaging and assembling parts located on said retractable portions of said delivery platform after said retractable portions are moved away from said path.

7. Assembly apparatus comprising, in combination, a support formed with a substantially horizontal cutout having top and bottom surfaces and being formed with a top substantially vertical opening communicating with said cutout through said top surface thereof and a bottom substantially vertical opening laterally spaced from said top opening and communicating with said cutout through said bottom surface thereof, said top surface of said cutout having a lower portion extending from said top opening toward said bottom opening and an upper portion located at a higher elevation than said lower portion and extending from said top opening away from said bottom opening; a moving member slidable along said bottom surface of said cutout and being formed with an opening aligned with said top opening in one position of said moving member and with said bottom opening in another position of said moving member so that elongated members moving downwardly through said top opening and having a length substantially equal to the distance between said bottom surface of said cutout and said lower portion of said top surface thereof will be received in said opening of said moving member to be moved with the latter to said other position thereof so as to fall into said bottom opening; spring means engaging said moving member; reciprocating means engaging said spring means to reciprocate said moving member through said spring means; catch means, connected to said reciprocating means for movement therewith, for catching said moving member when said spring means is compressed upon location of an elongated member of a length longer than said predetermined length in said opening of said moving member, whereby said moving member will be moved with said reciprocating means to move said longer elongated member to a third position; means for receiving said longer elongated member at said third position; and release means for releasing said moving member from said catch means when said moving member is located in said third position.

8. Assembly apparatus as defined in claim 7 and wherein said moving member has a top surface provided with an upper portion extending from said opening of said moving member away from said bottom opening and a lower portion lower than said upper portion and extending from said opening of said moving member toward said bottom opening, so that said spring will also be compressed when elongated members shorter than said predetermined length are located in said opening of said moving member, whereby elongated members which are shorter or longer than said predetermined length will automatically be eliminated from the apparatus.

References Cited in the file of this patent

UNITED STATES PATENTS

| | | |
|---|---|---|
| 1,256,897 | Hayward | Feb. 19, 1918 |
| 1,305,421 | Wax | June 3, 1919 |
| 2,015,573 | Strickland | Sept. 24, 1935 |
| 2,051,086 | Johnson | Aug. 18, 1936 |
| 2,556,413 | Boosey et al. | June 12, 1951 |
| 2,635,748 | Arlin | Apr. 21, 1953 |
| 2,651,412 | Aller | Sept. 8, 1953 |

FOREIGN PATENTS

| | | |
|---|---|---|
| 331,093 | Great Britain | June 26, 1930 |
| 667,759 | Great Britain | Mar. 5, 1952 |